United States Patent [19]

Larson et al.

[11] 4,426,608

[45] Jan. 17, 1984

[54] STEPPING MOTOR CONTROL SYSTEM

[75] Inventors: Noble G. Larson; John A. Purbrick, both of Arlington; Matthew T. Mason, Belmont, all of Mass.

[73] Assignee: Massachusetts Institute of Technology, Cambridge, Mass.

[21] Appl. No.: 253,035

[22] Filed: Apr. 10, 1981

[51] Int. Cl.$^3$ .............................................. G05B 19/40
[52] U.S. Cl. .................................... 318/685; 318/696; 318/138
[58] Field of Search ......................... 318/685, 696, 138

[56] References Cited

U.S. PATENT DOCUMENTS

| | | | |
|---|---|---|---|
| 3,863,118 | 1/1975 | Lander et al. | 318/685 |
| 3,968,416 | 7/1976 | Leenhouts | 318/696 |
| 4,145,644 | 3/1979 | Liu | 318/696 |
| 4,158,800 | 6/1979 | Jahelks et al. | 318/685 |

OTHER PUBLICATIONS

"Digital Methods Fixes Phase Log or Lead", D. W. Kennedy, Control Engineering, Aug. 1967, pp. 72–73.
"Closed-Loop Control of Step Motors", B. C. Kuo, p. 252 and Approaches to Step Motor Controls, J. R. Pawletks in Theory and Applications of Step Motors, B. C. Kuo, Editor, West Publishing Co., 1974.

Primary Examiner—B. Dobeck
Assistant Examiner—Saul M. Bergmann
Attorney, Agent, or Firm—Arthur A. Smith, Jr.; Robert F. O'Connell

[57] ABSTRACT

A stepping motor control system which uses a closed-loop lead angle control technique wherein a programmably selected lead angle signal is combined with a signal representing the position of a step motor shaft so as to provide a coil state excitation signal for the coils of the stepping motor, the shaft thereof being rotated in response to the coil state excitation signal. The lead angle signal can be modulated in accordance with a selected duty cycle so as to assume two adjacent lead angle values during each modulation cycle. The system can also be arranged to permit the use of open-loop control using a suitably programmed externally supplied coil state excitation signal, the latter being capable of similar modulation as described above with reference to lead angle modulation.

11 Claims, 5 Drawing Figures

STEPPING MOTOR CONTROL SYSTEM

The Government has rights in this invention pursuant to Contract Number N00014-77-C-0389 awarded by the U.S. Department of the Navy.

INTRODUCTION

This invention relates generally to motor control systems and, more particularly, to feedback control systems for controlling the operation of stepping motors.

BACKGROUND OF THE INVENTION

In many applications, it is desirable to be able to move devices, such as machine tools, from one position to another. Often, such devices utilize DC torque motors for such purpose, the positioning of such motors being appropriately controlled by suitable control circuitry. While DC motors provide high acceleration and fast slew rates in producing the desired motion, one of the problems of using said motors is that, while they are controllable at high speeds, they become much more difficult to control at low speeds and are subject to sticking and slipping problems. Accordingly, it becomes relatively difficult to provide for precise positioning of the devices which are moved thereby.

An alternative approach to position control lies in the use of stepping motors, generally in an open loop configuration. In contrast with DC torque motors, stepping motors generally can be adequately controlled at relatively low speeds. However, it becomes difficult to obtain the relatively high accelerations needed for moving relatively long distances from one position to another since stepping motors tend to move in noticeably discrete steps, it being difficult to get such motors to rapidly slew to desired positions. When using stepping motors in an open loop configuration, for example, the acceleration, as determined by the change in the stepping rate must not be so great that the motor can "slip" back on its torque curve. If such slippage occurs, the exact position of the motor is lost and accurate tracking of motor position cannot be achieved. To avoid such slippage, the acceleration must be limited to a value much less than it potentially could be. Furthermore, stepping motors present resonance and ringing problems at very low speeds.

It is desirable, therefore, that control circuitry be devised for controlling the operation of a motor which can provide the relatively high acceleration and fast slew rates of DC torque motors while also providing the accurate control of stepping motors at relatively low speeds. It is also desirable to provide facilities for lessening the resonance and ringing problems at very low speeds.

BRIEF SUMMARY OF THE INVENTION

In accordance with the invention, a stepping motor can be utilized in a suitable closed loop control configuration to achieve the desired characteristics. The stepping motor is digitally tracked by an appropriate digital encoder, such as an optical encoder, an encoder digital closed-loop feedback control system being arranged to provide a relatively simple way of controlling the stepping motor, which system can be readily implemented in hardware. The encoder feedback control system utilizes "lead angle" control in a manner which facilitates the overall design and provides for a stepping motor control system in which relatively high acceleration and slew rates, coupled with accurate positioning at low speeds, can be achieved.

The system of the invention can be described in more detail with the help of the accompanying drawing wherein.

Figure 1:
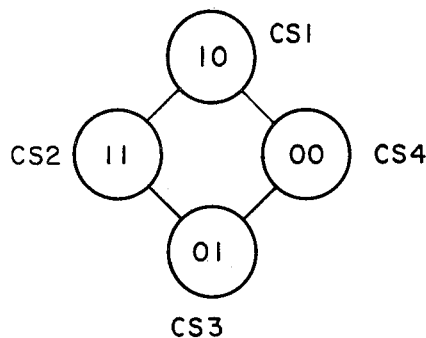
FIG. 1 shows a diagrammatic representation of the coil state transitions of a typical four coil stepping motor.
Figure 1A:
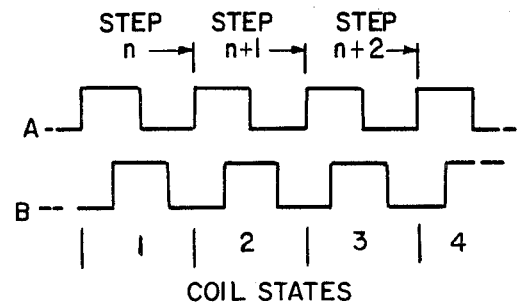
FIG. 1A shows the wave forms outputs of a typical encoder used in identifying the coil states of FIG. 1.

A typical stepping motor, such as made by Superior Electric Company of Bristol, Connecticut and identified as The Superior M-Series stepping motors, have a relatively large number of steps per revolution. For example, one such Superior M-Series stepping motor utilizes 200 steps per revolution, using four phase DC current control with a permanent magnet having bifilar windings. The four motor coils are grouped into two pairs, the coils within each pair being tightly linked inductively. For this invention, for example, one coil in each pair is always activated, resulting in four distinct states of operation, as shown in FIGS. 1 and 1A, the four coil states being represented as CS1, CS2, CS3, CS4 for each step of operation. By sequencing the coil states through the use of suitable motor driver circuitry, the motor shaft can be rotated in either direction, as is well known to the art. A suitable sensing encoder element, such as the Model 225 Trim-step encoder made by Datametrics Inc. of Wilmington, MA., can provide a pair of binary signals A and B the "0" and "1" states of which then partition the coil states, as shown in FIG. 1A, to identify the shaft position within such step. The encoder used in the specific embodiment discussed with respect to FIG. 2 resolves each motor step into 4 "encoder steps".

In understanding the structure and operation of the system of FIG. 2 the following terms as used herein can be defined in the following manner. The term phase angle can be defined as the amount by which the desired position of the step motor shaft as determined by the signals on the coil is leading the actual position of the shaft, i.e., the angle between the position to which the motor must move as a result of the coil state control signal applied thereto and the current position of the motor shaft. The lead angle is defined as one of the two phase angles associated with the instant that the motor coils are switched from one state to the next. In the case of forward motion of the motor, the lead angle is the phase angle after the coil transition is indicated. In the case of reverse motion, the lead angle is the phase angle before the transition. A convenient unit for lead angle is the encoder step.

In the specific embodiment discussed herein the phase angle can be described digitally for a four coil motor as the right-most four bits of the quantity (PA) which is obtained by subtracting the digital representation of the current shaft portion (POS) from four times the digital representation of the coil state (CS). The multiplying factor, 4, is necessary since a motor step consists of four encoder steps. Such relationship for a four coil stepping motor can be written as follows:

$$PA \times 4*CS - POS \text{ [rightmost 4 bits]}$$

The above equation represents the digitally encoded representation for the phase angle, coil state and position quantities.

The term "lead angle control" as used in connection with the invention consists of imposing a programmable lead angle (LA) upon the motor control system. Such control amounts to solving the phase angle equation for the 4-coil state quantity as follows:

$$CS = (POS + LA)/4 \text{ [rightmost 2 bits]}$$

Figure 2:
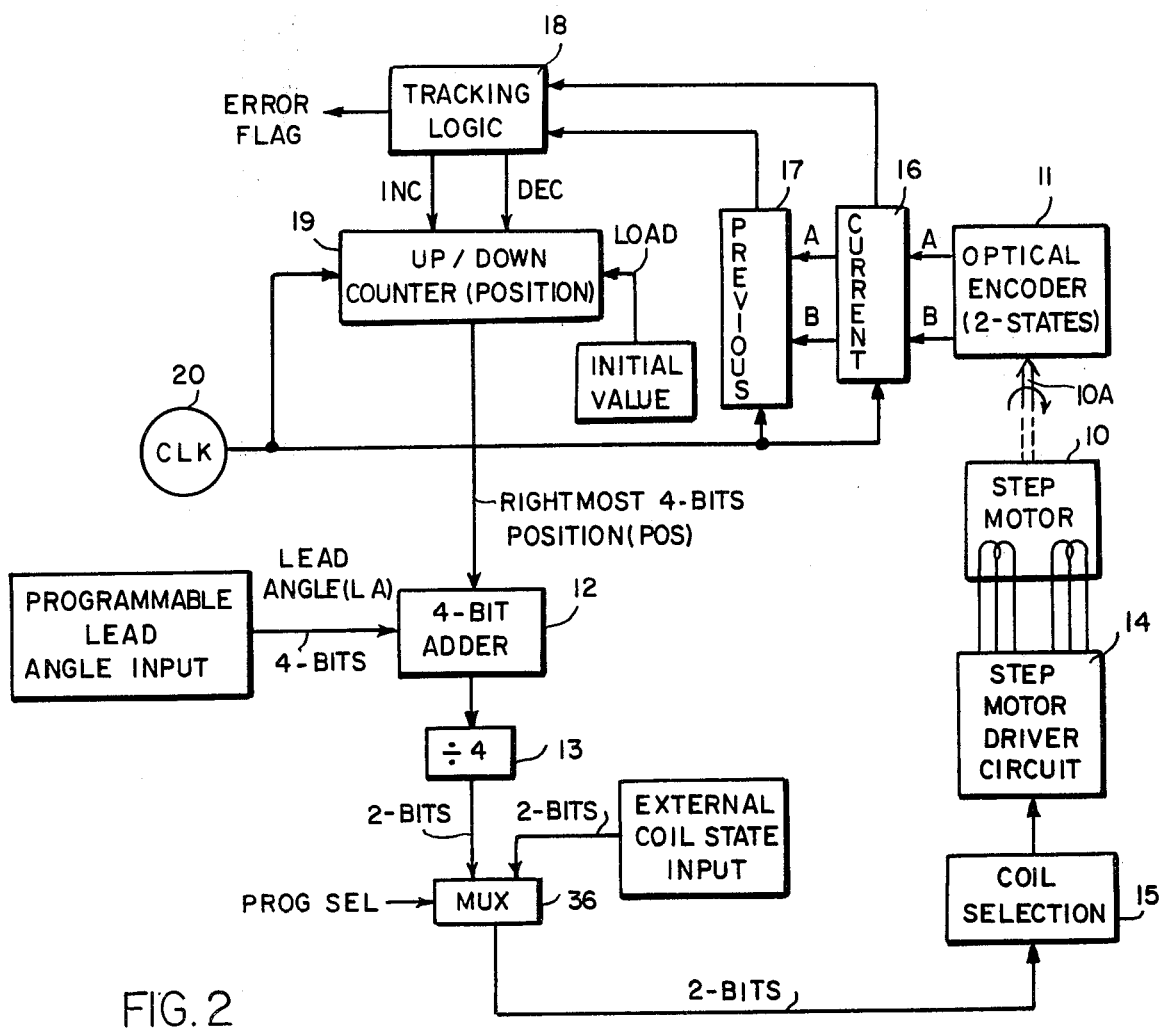
FIG. 2 shows a block diagram of one embodiment of the stepping motor control system of the invention.
Figure 3:
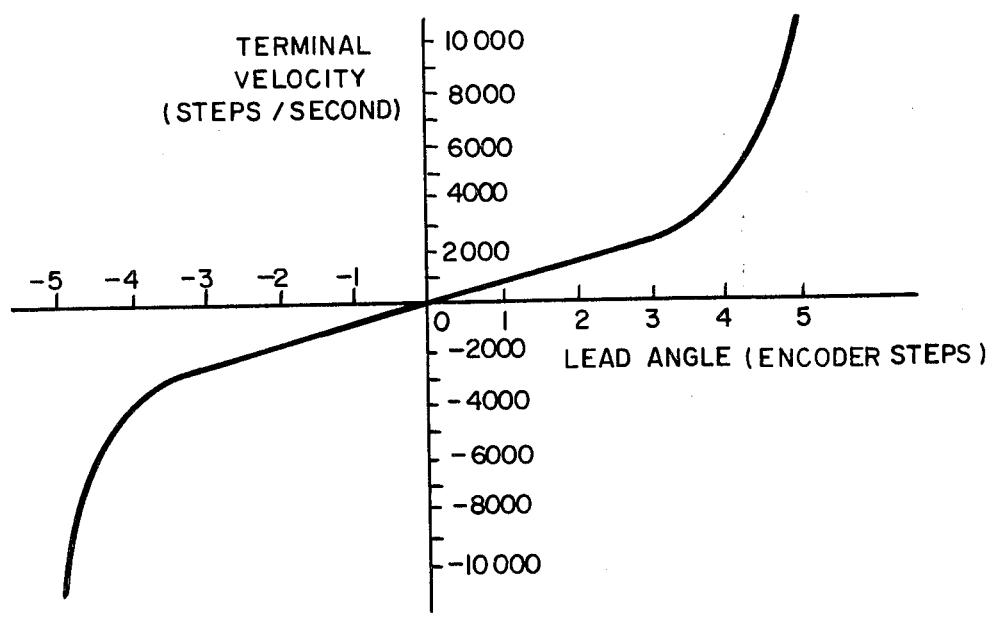
FIG. 3 shows a typical curve of the terminal velocity of a stepping motor as a function of lead angle.

The block diagram of FIG. 2 illustrates an appropriate technique for providing such closed-loop, lead angle control. As can be seen therein, an appropriate programmable lead angle input, under control of a system user, is made available (such lead angle may be supplied, for example, via software control) in digital, e.g., binary, encoded form. The digital lead angle signal is added to a digitally encoded position signal (POS) which represents the current motor position, as at digital adder 12. The sum of the digital position signal and the selected lead angle signal is sutiably divided by four to provide the digitally encoded coil state signal which can then be directly supplied to a motor driver circuit 14 via a coil selection circuit 15 for selecting the required state of the motor coils.

While the output of divider 13 can be supplied directly to coil selection circuit 15 as discussed above, the system may also be arranged to have a capability for supplying a direct, encoded coil state input signal from an external source without using the lead angle control of the invention. For such dual-mode of operation a suitable multiplexer unit 36, having both a lead angle control input from divider 13 and an external coil state input, can be used. The desired mode of operation (i.e., closed-loop lead angle control or straight-forward open-loop external control) can be selected by a suitable multiplexer selection signal (PROG SEL) as supplied by software or imposed in some other manner directly by a user.

The position of the motor shaft 10A is appropriately sensed, or monitored, by optical encoder 11, or other suitable encoder as mentioned above, which encoder provides the two binary encoded signals A and B, which vary with shaft position as shown in FIG. 1A. The resolution of the optical encoder 11 determines the number of sub-positions within each motor step position which can be resolved by the system. For example, a two-phase, 200 pulse per revolution optical encoder used with a 300 step per revolution motor can distinguish four shaft positions per motor step. For higher resolution encoders, the number of intermediate substep positions will depend upon the encoder resolution.

In the particular embodiments shown, the optical encoder provides two binary output signals A and B which represent the current substep motor position, which signals are supplied to a parallel-loaded "current" subposition two-bit register 16. Similarly the outputs of this register are provided as inputs to a "previous" position register 17. Both are continuously sampled by a suitable high frequency clock 20 (having a frequency, for example, of at least 100 KHz). The contents of registers 16 and 17 are concurrently supplied to suitable tracking logic 18 which compares the new (current) position with the old (previous) position represented by registers 16 and 17, respectively, to provide an appropriate signal input to an up/down position counter 19. When a change occurs (i.e., the current position differs from the previous position), the tracking logic provides either an increment output pulse (INC) or a decrement output pulse (DEC) depending on whether there has been a forward or a reverse direction of the motor shaft movement. The up/down counter 19 counts upwardly for an incremented position change or downwardly for a decremented position change. The initial value of the motor shaft position is entered into the up/down position counter 19, as shown, so that the up/down counter output represents the changed position from such initial position for each substep movement. Thus, as the step motor 10 moves in one direction or the other, the position counter output tracks the movement of the step motor shaft and provides a digital position (POS) signal representing the current shaft position.

The last 4 bits of the up/down counter 19 are added to the lead angle signal (a signal also having 4 bits). The output of the digital adder circuit 12 is then divided by 4 as discussed above, to produce the digitally encoded coil state signal for supply to the step motor driver circuit.

The overall circuitry of FIG. 2 provides an effective technique, which is relatively easy to implement, for providing suitable hardware to achieve closed-loop lead angle feedback control of stepping motor 10, with the added provision, if desired, for permitting direct, open-loop, coil-state control using a suitably programmed externally supplied input, as shown.

The encoder used for the specific embodiment of FIG. 2 partitioned each motor step into $2^N$ encoder steps, where N=2. Higher resolution encoders where N>2 could easily be used instead, to provide finer partitioning of each motor step and also provide finer partitioning of the lead angles. Accordingly, the position and lead angle inputs to adder 12 will each comprise N+2 bits. The output of adder 12 will then be divided by $2^N$ (right shift by N). Further, while the specific embodiment of FIG. 2 utilizes a four-phase stepping motor, a stepping motor having a different number of phases can be used with appropriate changes in the specific circuitry as would be within the skill of the art.

Figure 4:
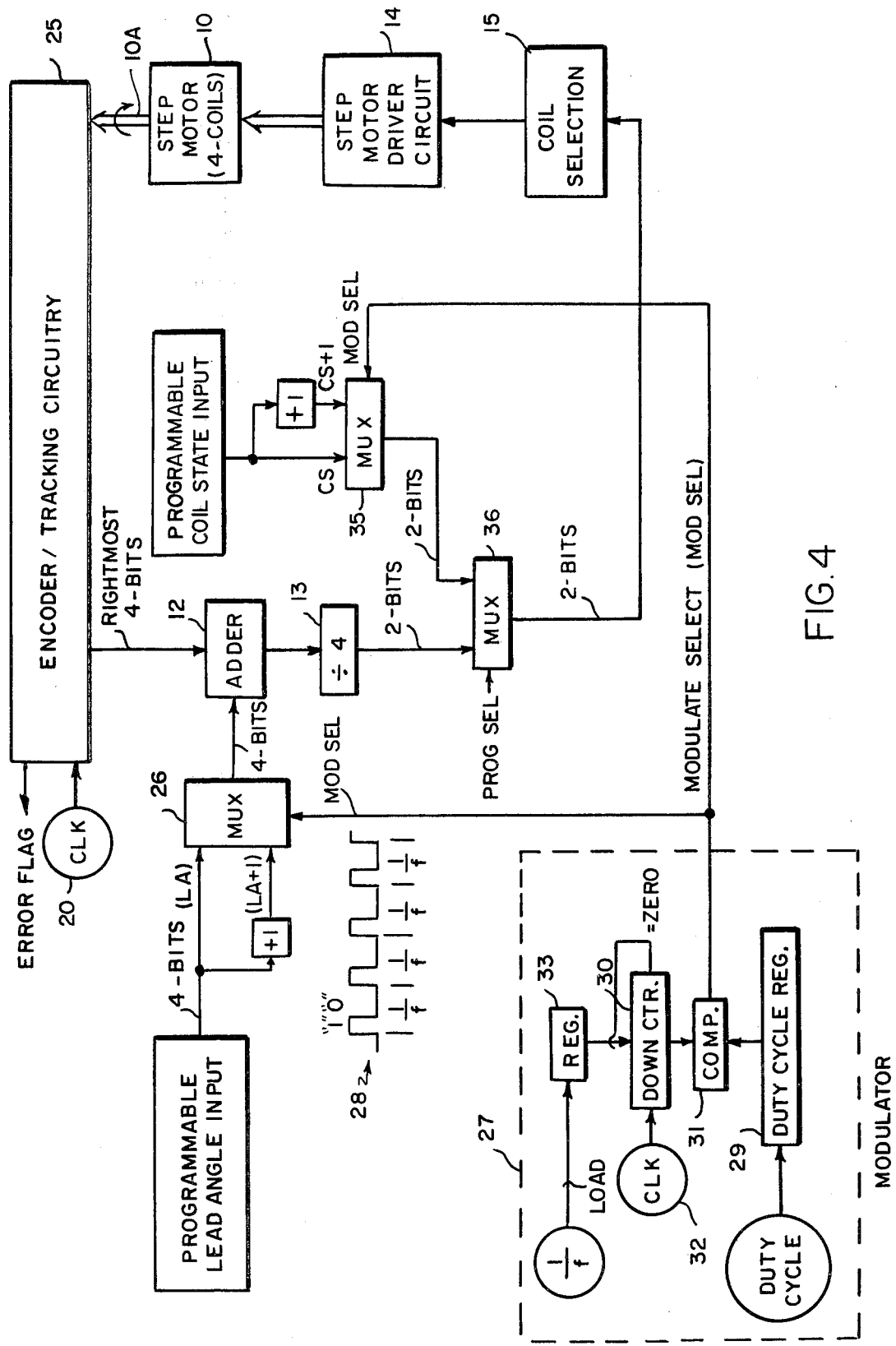
FIG. 4 shows a block diagram of another embodiment of the stepping motor control system of the invention.

The lead angle closed-loop control system shown in FIG. 2 is useful in many applications, but it provides only 16 different lead angles. In order to provide the effect of additional intermediate lead angles a technique discussed with reference to the system shown in FIG. 4, which technique cn be termed "lead angle modulation" control, can be utilized. In accordance with such control it is possible to obtain the effect of intermediate lead angles by modulating the lead angle input between two adjacent lead angle values at a selected rate. The value of the resulting effective lead angle depends on the duty cycle used in the modulation technique, i.e., on how much time, over a particular modulation cycle, is spent applying one selected lead angle and how much time is spent applying the adjacent selected lead angle, as discussed in more detail below. one embodiment of a lead angle modulation control system is shown in FIG. 4 wherein the system of FIG. 2 is reproduced in general form and can utilize exemplary encoding and tracking circuitry 25 of the type discussed in connection with FIG. 2 including, for example, an optical encoder, current and previous position registers, suitable tracking logic and an up/down counter.

In accordance with the above discussed lead angle modulation control technique, the lead angle which is supplied to adder 12 varies between two selected values, which are represented by a first programmable lead angle (LA) and a second adjacent programmable lead angle (LA−1), suitably supplied to a multiplexer 26. The output of multiplexer 26 thereupon provides one or the other of such lead angle values to adder 12 depending on a "modulate select" (MOD SEL) signal which controls the relative times within a particular modulation cycle during which each of the adjacent lead angle values is supplied to adder 12.

The MOD SEL signal is obtained from a suitable modulator circuit 27. Thus, the output of modulator 27 is a signal of the type representatively shown by signal 28 which varies between a first state (e.g., the "1" state) and a second state (e.g., the "0" state) during a particular modulation cycle. The multiplexer 26, for example, operates to supply the first lead angle (LA) when MOD SEL is in its "1" state and the adjacent lead angle (LA+1) when MOD SEL is in its "0" state during each modulation cycle, the lead angle thereby varying between (LA) and (LA+1) during each cycle. The time relationship between the two states of the MOD SEL signal determines the effective lead angle value between (LA) and (LA+1).

The modulator circuit 27 which provides the selected duty cycle for the MOD SEL signal utilizes a duty cycle register 29 which is loaded with a selected value as shown. Such value is compared to the value of the down counter 30 via comparator 31. So long as the duty cycle value loaded into duty cycle register 29 is greater than the value in down counter 30, the MOD SEL signal output from the comparator 31 is in its "1" state. When the down counter value is less than that of the duty cycle register value the MOD SEL is in its "0" state. The down counter is suitably clocked by a clock signal 32 and clocks down from a maximum value to a zero value over a selected modulation time cycle represented by 1/f. The latter value is loaded into a register 33, the value of which is supplied to down counter 30. When the down counter is clocked from its maximum value to its zero value over the time period 1/f as controlled by register 33, the down counter is again reloaded with the value of register 33 and the downward clocking operation repeats.

When the down counter is clocked down to a value where it equals the value of the duty cycle register the MOD SEL signal changes state from "1" to "0".

Thus, the lead angle input can be appropriately modulated to vary between the two lead angle values (LA) and (LA+1) the duty cycle for such modulation process being controlled by the value of duty cycle register 29 so that an appropriate effective lead angle value between the adjacent lead angle values can be selected.

The modulation control technique described with reference to the lead angle control concept can also be applied to the open-loop, external coil state input control technique discussed in FIG. 2. Thus, a similar "coil state modulation" control operation can be performed in the open-loop approach with respect to a programmable coil state input signal supplied to multiplexer 36 shown in both FIG. 2 and FIG. 4. The programmable coil state signal supplied to multiplexer 36 can be either a selected coil state signal (CS) or an adjacent coil state signal (CS+1) as supplied from another multiplexer 35.

In the same manner as discussed above, modulator circuit 27 provides a MOD SEL signal which selects a duty cycle for multiplexer 35 to determine a desired intermediate coil state which depends on the time relationship for the supplying of (CS) and of (CS+1). Thus, such open-loop coil state modulation control can provide for the selection of a coil state which is in effect between the discrete coil states discussed above with reference to FIGS. 1 and 1A.

The use of open-loop coil state control at low speeds may be effective in many applications even without the use of such coil state modulation control operation. However, in many applications the use of coil state modulation control tends to creat a smoother motion at low speed operation without stick-up and slip problems which can affect low speed closed-loop control.

The systems depicted in FIGS. 2 and 4 can be used in a variety of combinations under different conditions to provide for a desired operation of a stepping motor for many different operations. Lead angle control can be used, for example, for moving quickly from one position to another. Lead angle modulation control can provide the fast positioning associated with lead angle control with the additional capability of providing for selected velocities or general trajectory control, the effective lead angle being chosen using standard servo techniques.

Coil state control can be used in an open-loop operation at moderate speeds, as in conventional step motor control circuits. Coil state modulation control, as discussed above, can also be utilized at low speeds to avoid ringing problems which can occur when straightforward open-loop coil state control is used and also to avoid any undesirable resonances which may occur at low speed operation in some applications.

The time at which the system is arranged to convert from a closed-loop operation (whether lead angle control or lead angle modulation control) to open-loop operation (whether coil state control or coil state modulation control) will depend on the particular application in which the system is used, and such conversion can be appropriately controlled by the program select (PROG SEL) signal to multiplexer 36. In general, closed-loop control is best used during moderate to high speed or high acceleration positioning operations while open-loop control is used during low to moderate speed, low acceleration operations.

While the specific logic utilized for the particular embodiments disclosed and discussed above provides a suitable operating system implemented in a manner which utilizes components well known to those in the art, modifications thereof in such embodiments may occur to those in the art. Hence, the invention is not to be construed as limited to the specific embodiments disclosed herein, except as defined by the appended claims.

What is claimed is:

1. A stepping motor control system comprising stepping motor means having means for rotating through a plurality of steps during each revolution thereof and a plurality of selectably actuated coil means having a selected number of coil states for moving said rotating means through a selected number of sub-step positions within each of said plurality of steps;

means for sensing the sub-step positions of said rotating means and for providing a position signal representing the position of said rotating means relative to an initial position thereof;

means for providing a signal representing a selected lead angle;

means for combining said lead angle signal and said position signal to produce a coil state excitation signal representing a selected combination of said plurality of coil means which are to be actuated in response to said coil state signal; and motor drive circuit means responsive to said coil state excitation signal for actuating said selected combination of said coil means to move said rotating means in response thereto.

2. A stepping motor control system comprising stepping motor means having shaft means for rotating through a plurality of steps during each revolution thereof and a plurality of selectably actuated coil means having a selected number of coil states for moving said shaft means through a selected number of sub-step positions within each of said plurality of steps;

digital position encoding means for sensing the sub-step positions of said shaft means and for providing a digitally encoded position signal representing the position of said shaft means relative to an initial position thereof, means for providing a digitally encoded signal representing a selected lead angle;

means for combining said digitally encoded lead angle signal and said digitally encoded position signal to produce a digitally encoded coil state excitation signal representing a selected combination of said plurality of coil means which are to be actuated in response to said encoded coil state signal; and motor drive circuit means responsive to said digitally encoded coil state excitation signal for actuating said selected combination of said coil means to rotate said shaft means in response thereto.

3. A stepping motor control system in accordance with claim 2 wherein said digital position encoding means is an optical encoder.

4. A stepping motor control system in accordance with claims 1 or 2 wherein the said lead angle is programmably selected from a finite number of lead angle values.

5. A stepping motor control system in accordance with claims 1 or 2 and further wherein said coil state excitation signal can be supplied from an external coil state input signal source and said system includes means for selecting said coil state excitation signal from said combining means or from said external coil state input signal source.

6. A stepping motor control system in accordance with claims 1 or 2 and further including means for modulating said lead angle signal so that said lead angle signal varies between a plurality of selected lead angle values during each modulation cycle.

7. A stepping motor control system in accordance with claim 6 wherein said lead angle varies between two selected lead angle values and said modulating means includes means for controlling the relative times within each modulation cycle that said lead angle signal assumes each of said two selected lead angle values.

8. A stepping motor control system in accordance with claim 5 and further including means for modulating said external coil state signal so that said external coil state signal varies between a plurality of selected values during each modulation cycle.

9. A stepping motor control system in accordance with claim 8 wherein said external coil state signal varies between two selected coil state signal values and said modulating means includes means for controlling the relative times within each modulation cycle that said external coil state signal assumes each of said two selected external coil state values.

10. A stepping motor control system in accordance with claim 8 or 9 wherein said modulating means is further capable of modulating said lead angle signal so that said lead angle signal varies between a pluality of selected lead angle values during each modulation cycle.

11. A stepping motor control system in accordance with claim 10 wherein said lead angle varies between two lead angle values and said modulating means is further capable of controlling the relative times within each modulation cycle that said lead angle signal assumes each of said two selected lead angle values.

* * * * *